(12) United States Patent
Kamemizu et al.

(10) Patent No.: US 6,676,149 B2
(45) Date of Patent: Jan. 13, 2004

(54) LAYOUT STRUCTURE OF VEHICULAR PARKING DEVICE

(75) Inventors: Fuminori Kamemizu, Saitama (JP); Sadamichi Enjyo, Saitama (JP); Yoshinobu Honda, Saitama (JP); Katsuichi Yagisawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 125 days.

(21) Appl. No.: 09/947,345

(22) Filed: Sep. 7, 2001

(65) Prior Publication Data

US 2002/0030344 A1 Mar. 14, 2002

(30) Foreign Application Priority Data

Sep. 8, 2000 (JP) .......................................... 2000-273918
Mar. 23, 2001 (JP) .......................................... 2001-084138

(51) Int. Cl.$^7$ ................................................. B62K 9/00
(52) U.S. Cl. .................... 280/281.1; 280/291; 180/218; 180/325
(58) Field of Search ................................. 180/218, 219, 180/325; 280/291, 294; 288/24.22, 24.21

(56) References Cited

U.S. PATENT DOCUMENTS

| | | | | |
|---|---|---|---|---|
| 4,487,282 A | | 12/1984 | Wakatsuki et al. | |
| 4,534,439 A | * | 8/1985 | Shimazaki et al. | 180/215 |
| 4,671,374 A | * | 6/1987 | Kouyama et al. | 180/219 |
| 4,697,663 A | * | 10/1987 | Trautwein | 180/210 |
| 4,830,134 A | * | 5/1989 | Hashimoto | 180/219 |
| 6,047,786 A | * | 4/2000 | Stevenson et al. | 180/65.1 |
| 6,073,719 A | * | 6/2000 | Ohmika et al. | 180/219 |
| 6,450,301 B1 | * | 9/2002 | Iizuka et al. | 188/26 |
| 6,492,805 B1 | * | 12/2002 | Wakabayashi et al. | 324/173 |

FOREIGN PATENT DOCUMENTS

| | | |
|---|---|---|
| EP | 0 909 695 A | 4/1999 |
| JP | 6253398 | 11/1987 |
| JP | 08 318883 A | 12/1996 |

* cited by examiner

Primary Examiner—Paul N. Dickson
Assistant Examiner—Toan C To
(74) Attorney, Agent, or Firm—Birch, Stewart, Kolasch & Birch, LLP

(57) ABSTRACT

A head pipe that supports a handle for a scooter type vehicle is covered with a front cover. Article container boxes are disposed in an upper portion of a rear side of the front cover, and a parking lever is disposed below the article container boxes. Accordingly, an opening of each article container box can be made larger and it is possible to increase the capacity of each container box. Large article container boxes can be disposed in the front cover and in the vicinity of the handle. A parking lever can be disposed in the front cover and in the vicinity of the handle at a position permitting a vehicle rider to easily reach and operate the lever without requiring any forced motion.

18 Claims, 9 Drawing Sheets

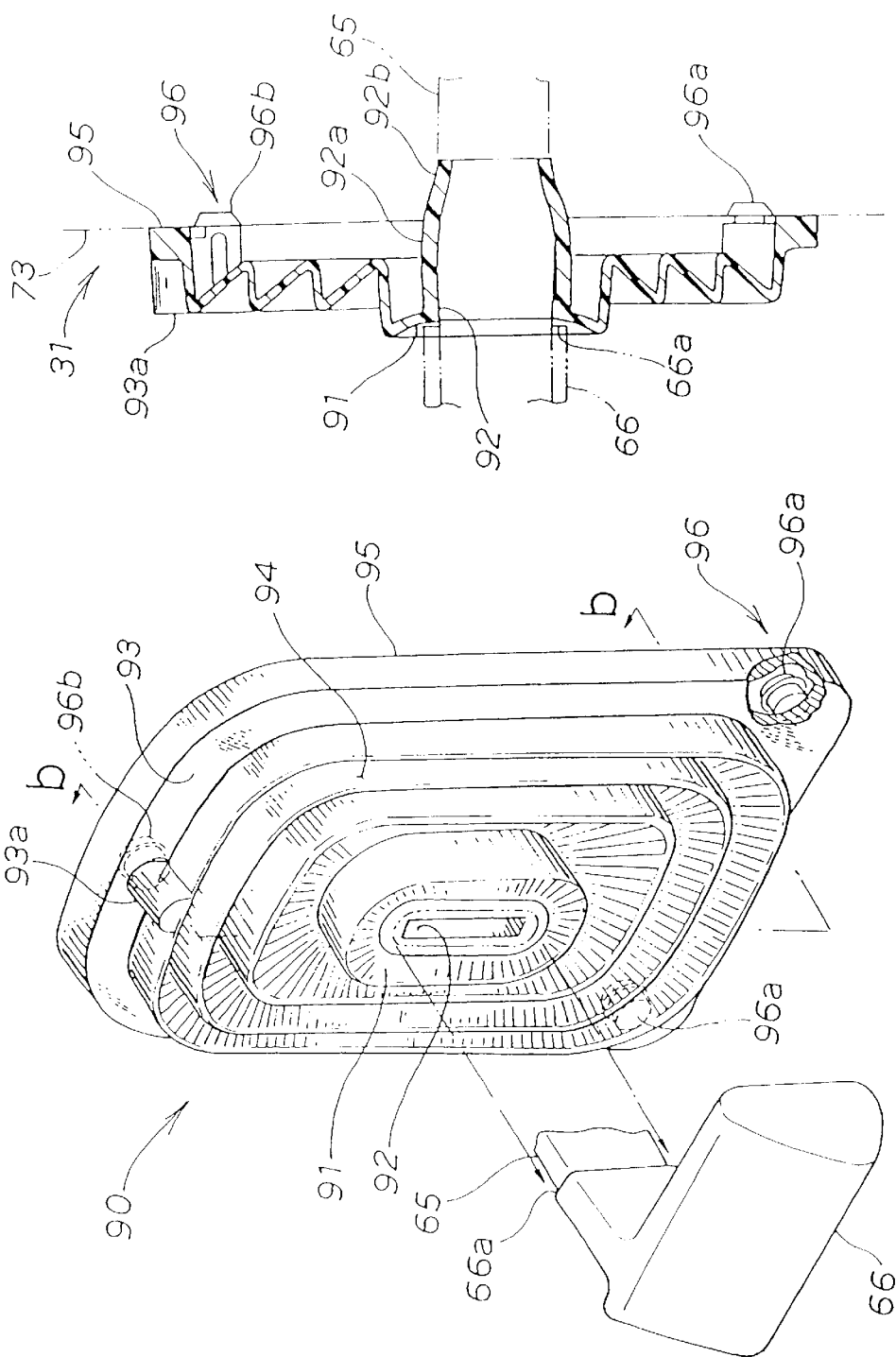

LAYOUT STRUCTURE OF VEHICULAR PARKING DEVICE

BACKGROUND OF THE INVENTION

This nonprovisional application claims priority under 35 U.S.C. §119(a) on Patent Application No. 2001-084138 filed in Japan on Mar. 23, 2001, and Patent Application No. 2000-273918 filed in Japan on Sep. 8, 2000, the entirety of each of which are herein incorporated by reference.

FIELD OF THE INVENTION

The present invention relates to the structure of a vehicular parking device.

DESCRIPTION OF THE BACKGROUND ART

Japanese Patent Publication No. 53398/1987 discloses a vehicular parking device for a small-sized vehicle. As seen in FIG. 3 of Japanese Patent Publication No. 53398/1987, this type of parking lock device includes a parking lever 20 attached to a handle 5 which projects above a leg shield 4. After the parking lever 20 in the parking lock device is operated to obtain a locking operation, a release motion of the same lever is inhibited with a main switch to prevent a third person from inadvertently releasing the locked parking lever 20.

There is currently a demand for providing an article container box around the leg shield 4 and the handle 5 of a vehicle. The rider is not required to perform any forced operation of the handle 5 and equipment located in the vicinity thereof when using an article container box in this position.

However, since the area around the handle and the vicinity thereof is narrow, it has so far been difficult to form a large article container box. Further, there is a concern that the article container box may interfere with the parking lever 20 when articles are taken into and out of the box when the box is provided near the handle 5.

SUMMARY OF THE INVENTION

The present invention overcomes the shortcomings associated with the background art and achieves other advantages not realized by the background art.

It is an object of the present invention to provide a layout structure for a vehicular parking device which permits the simultaneous provision of a large article container box near a handle and the inconspicuous layout of a parking lever.

These and other objects are accomplished by a scooter type vehicle comprising a handle for operatively controlling a front wheel of a pair of wheels; a seat; a head pipe supporting the handle and covered by a front cover; flat step floors for putting feet thereon are provided between the handle and the seat; an article container box disposed at an upper position of a rear side of the front cover; and a vehicular parking device having a parking lever, the parking lever disposed in a position below the article container box.

These and other objects are further accomplished by a scooter type vehicle comprising a handle for operatively controlling a front wheel of a pair of wheels; a rider's seat; a head pipe supporting the handle and covered by a front cover; flat step floors for putting feet thereon are provided between the handle and the seat; an article container box disposed at an upper position of a rear side of the front cover; a vehicular parking device having a parking lever, the parking lever disposed in a position below the article container box; and a boot in a position surrounding the parking lever.

If an article container box is disposed at an upper position of the rear side of a front cover, the opening of the container box can be made relatively large and the volume of the box can also be enlarged. Accordingly, a large container box can be disposed near the handle in the front cover.

Further, if a parking lever is disposed below the article container box, it is possible to provide the parking lever near the handle in the front cover. In that position, the parking lever does not require any forced motion and is easy to operate. Further, it becomes difficult for the parking lever to be seen and accessed by a third party.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

The present invention will hereinafter be described with reference to the accompanying drawings.

FIGS. 9(a) through 9(b) are side views a boot according to an embodiment of the present invention.

DETAILED DESCRIPTION OF THE PREFERRED EMBODIMENTS

Figure 1:
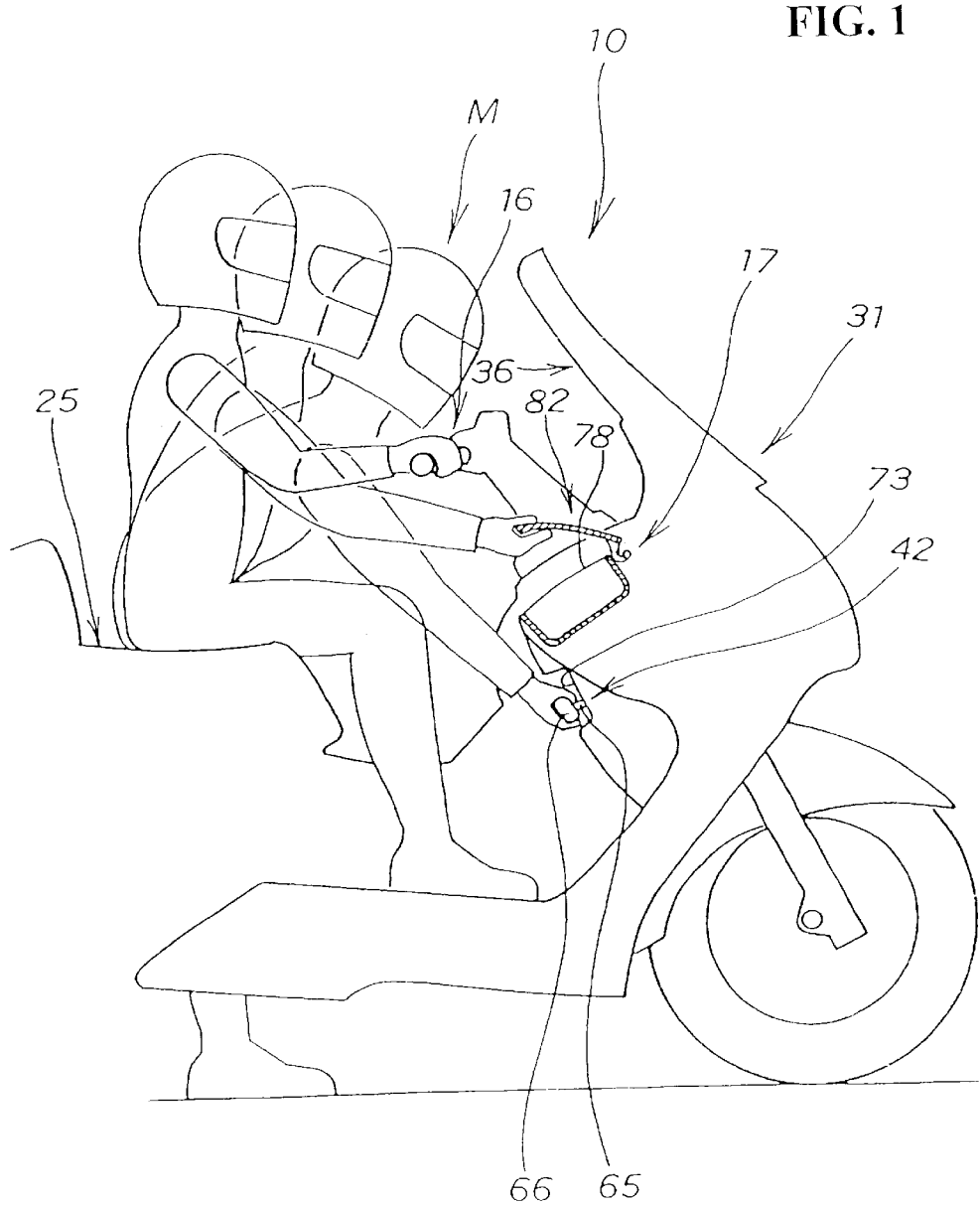
FIG. 1 is a side view of a layout structure of a vehicular parking device according to an embodiment of the present invention.
Figure 2:
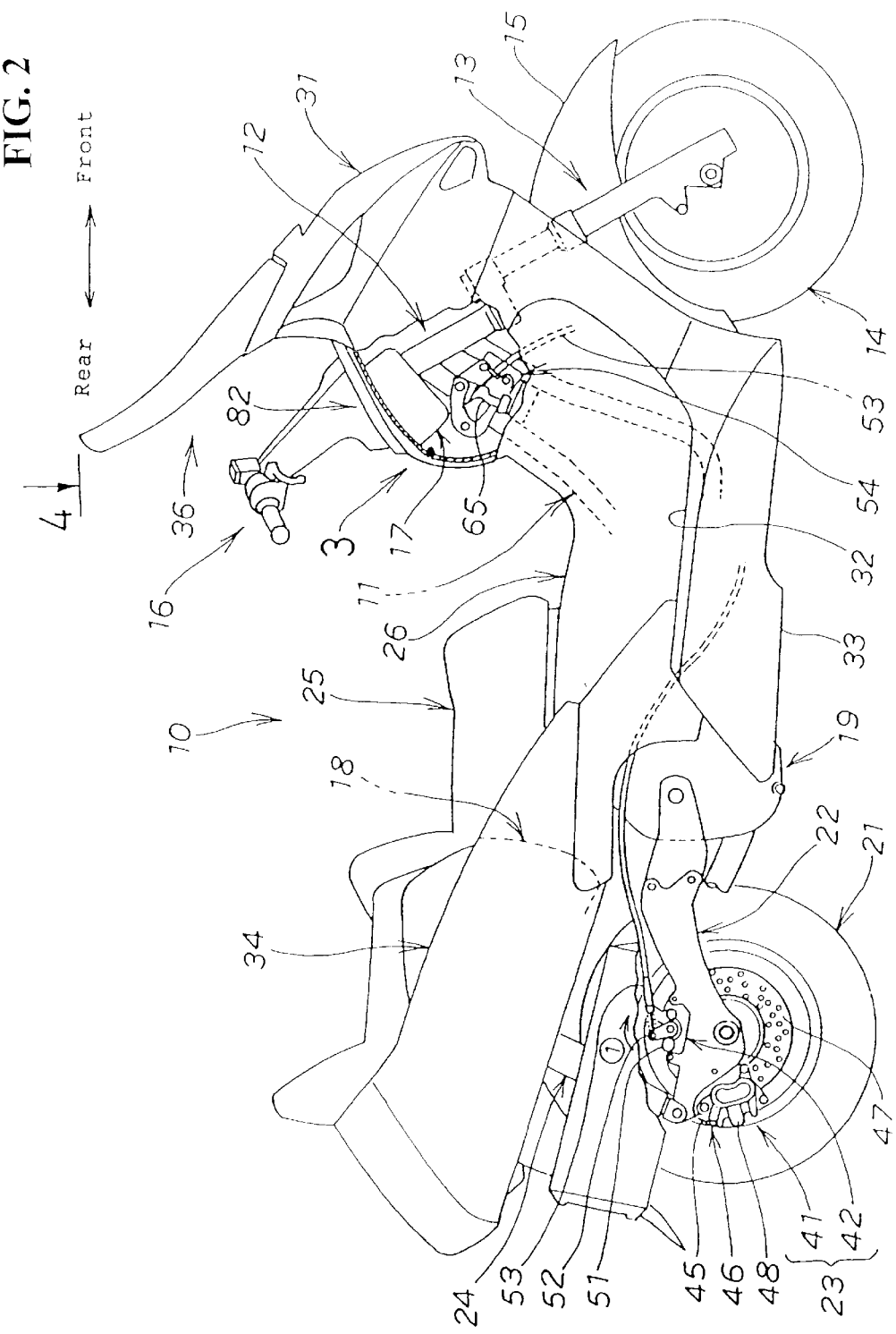
FIG. 2 is a right side view of an exemplary vehicle related to the present invention.
Figure 3:
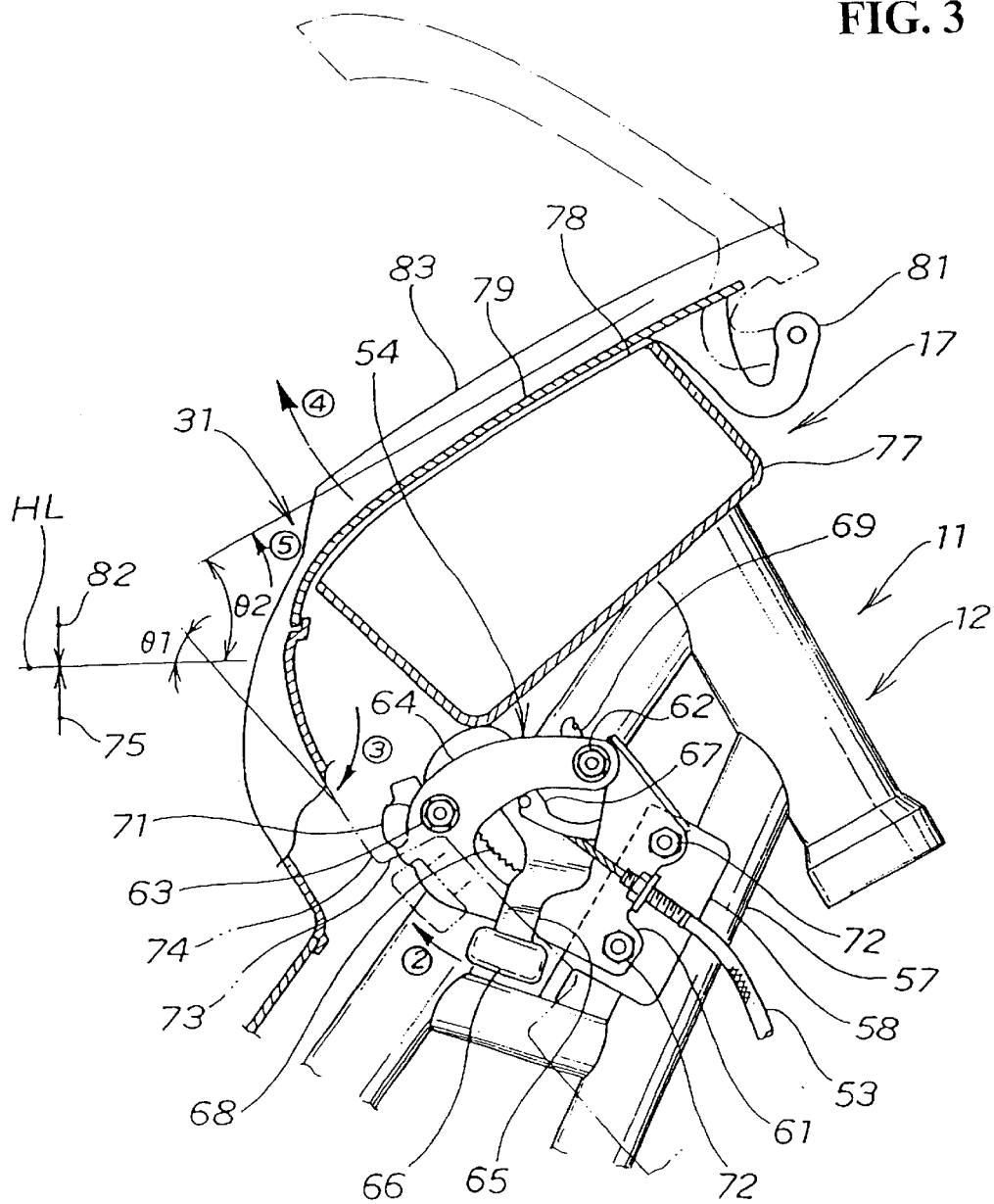
FIG. 3 is an enlarged view of the portion indicated by the numeral 3 in FIG. 2.
Figure 4:
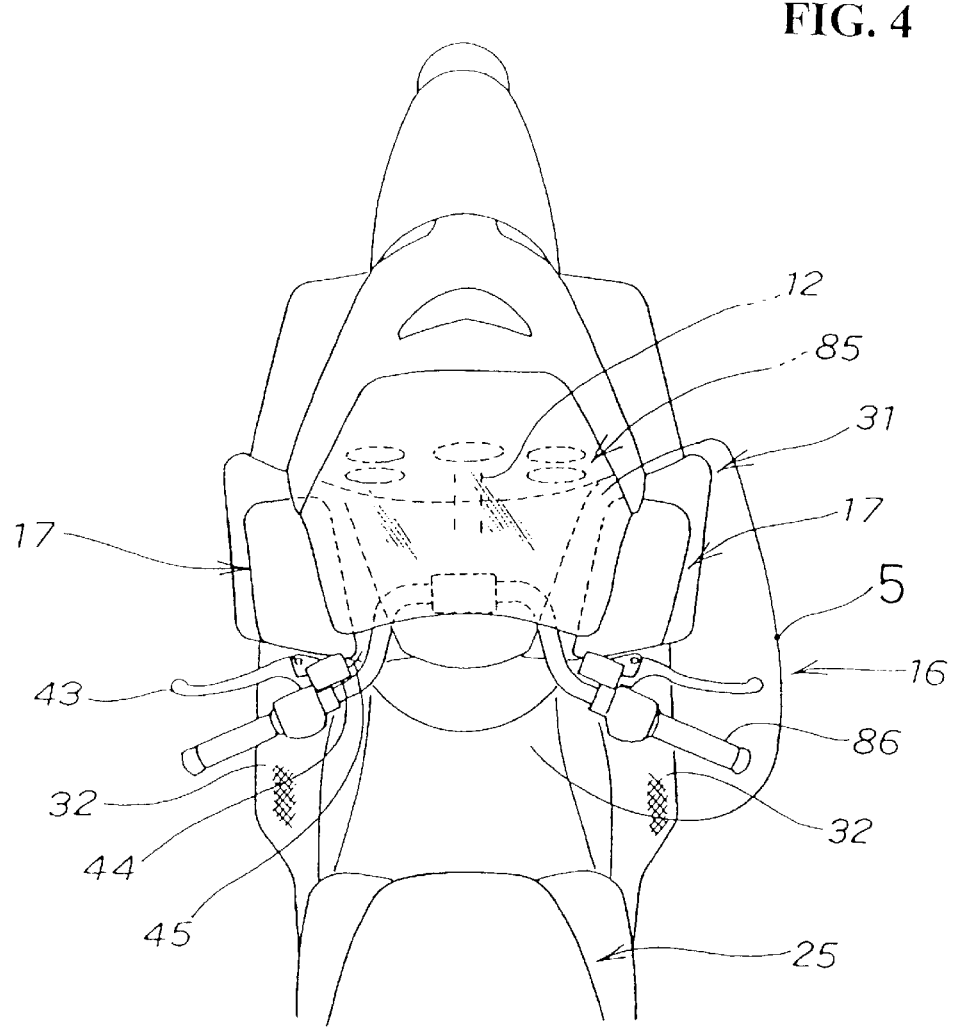
FIG. 4 is a frontal view as seen in the direction of arrow 4 in FIG. 2.
Figure 5:
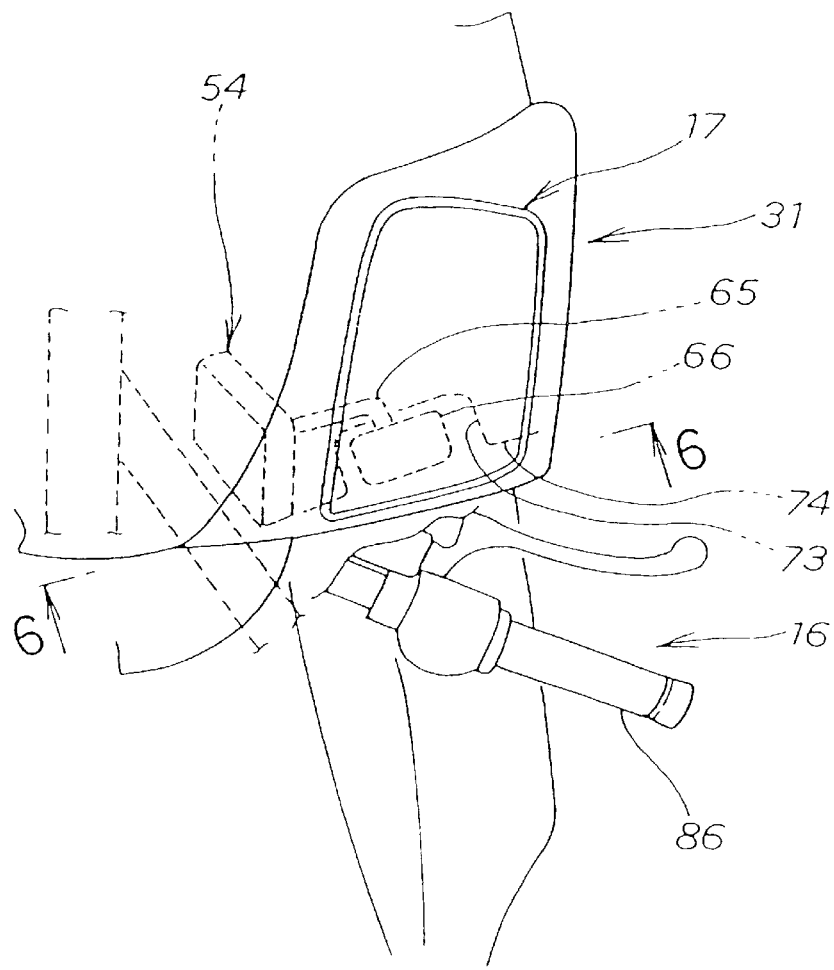
FIG. 5 is an enlarged view of the portion indicated by numeral 5 in FIG. 4.

The present invention will hereinafter be described with reference to the accompanying drawings. FIG. 1 is a side view of a layout structure of a vehicular parking device according to an embodiment of the present invention. FIG. 2 is a right side view of an exemplary vehicle related to the present invention. FIG. 3 is an enlarged view of the portion indicated by the numeral 3 in FIG. 2. FIG. 4 is a frontal view as seen in the direction of arrow 4 in FIG. 2. FIG. 5 is an enlarged view of the portion indicated by numeral 5 in FIG.

Figure 6:
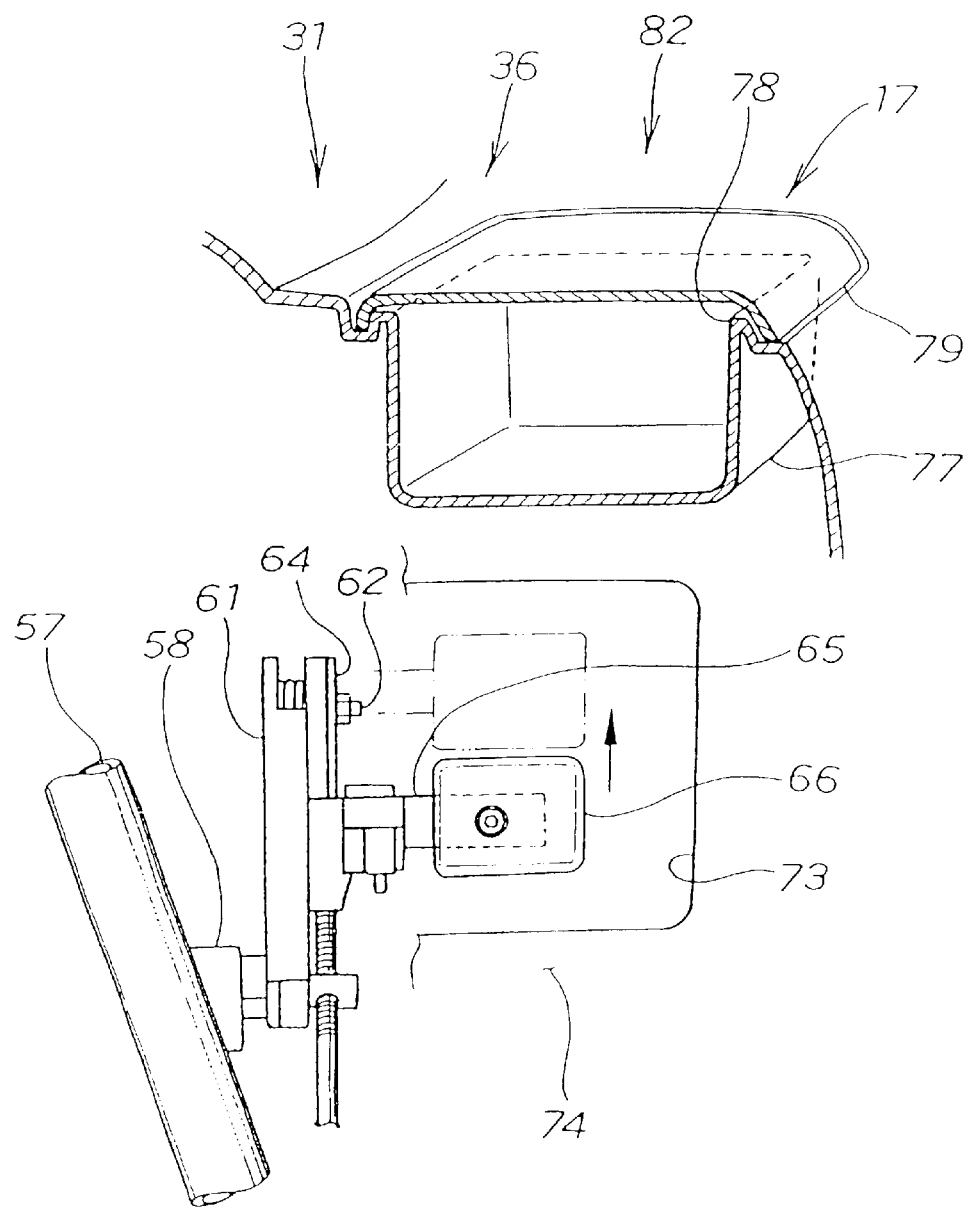
FIG. 6 is a sectional view taken along line 6—6 in FIG. 5.
Figure 7:
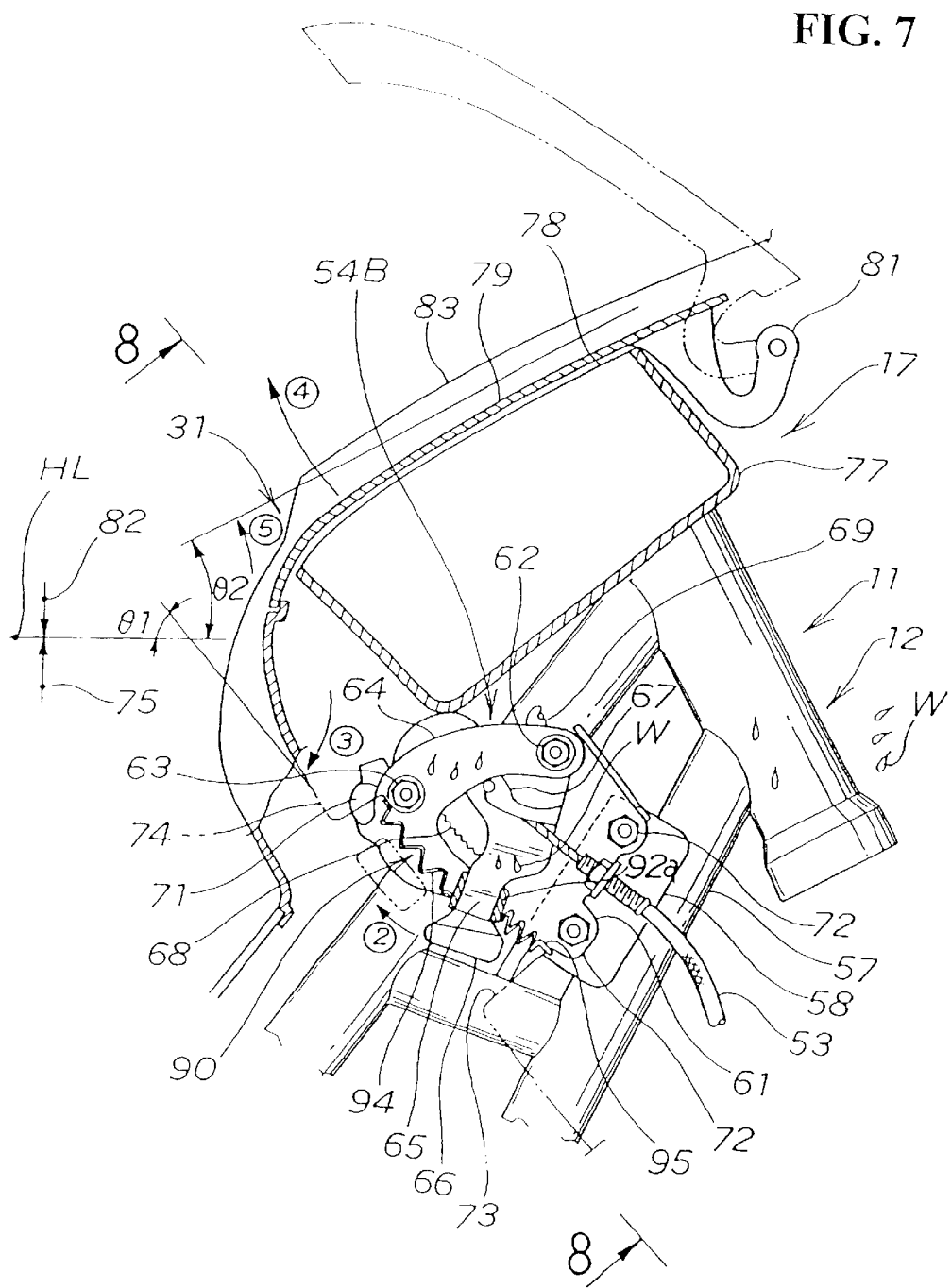
FIG. 7 is an enlarged view of the portion indicated by the numeral 3 in FIG. 2 according to another embodiment of the present invention.
Figure 8:
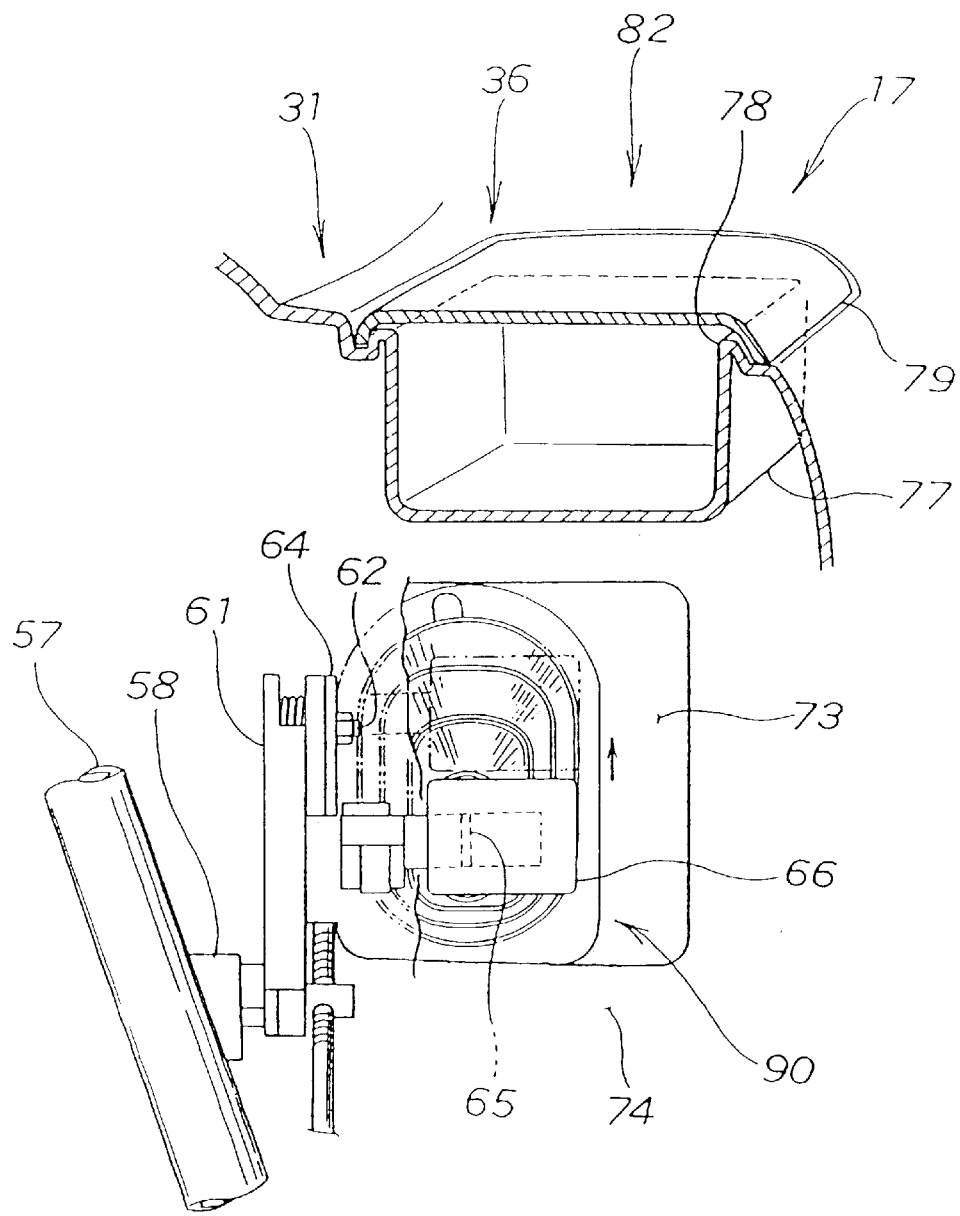
FIG. 8 is a sectional view taken along line 8—8 in FIG. 7.

4. FIG. 6 is a sectional view taken along line 6—6 in FIG. 5. FIG. 7 is an enlarged view of the portion indicated by the numeral 3 in FIG. 2 according to another embodiment of the present invention. FIG. 8 is a sectional view taken along line 8—8 in FIG. 7. FIGS. 9(*a*) through 9(*b*) are side views a boot according to an embodiment of the present invention.

It is hereinafter assumed that the drawings will be viewed in a position in which the reference numerals are read in their properly oriented positions. In addition, the terms "left" and "right" indicate directions as seen from the rider side, "front" is an advancing side and "rear" is the opposite side with respect to a rider of a vehicle.

FIG. 1 is a side view of a layout structure of a vehicular parking device according to an embodiment of the present invention. An article container box 17 is disposed on an upper side of a front cover 31 of a vehicle 10. A parking device 42 is disposed on the lower side of the front cover 31. The parking device 42 will be described in greater detail hereinafter.

FIG. 2 is a right side view of an exemplary vehicle related to the present invention. The vehicle 10 is a scooter type vehicle having a body frame 11, a front fork 13 mounted to a head pipe 12 of the body frame 11, and a front wheel 14 and a front fender 15 both secured to the front fork 13. A handle 16 is connected to the front fork 13, a pair of article container boxes 17 (only a right-hand is shown) are disposed below the handle 16, and a rear container box 18 is installed on a rear portion of the body frame 11.

The vehicle 10 also includes a power unit 19 attached to a lower portion of the body frame 11, a rear wheel 21 secured to a rear portion of the power unit 19, a swing arm 22 attached to the power unit 19, a rear brake unit 23 provided on the rear wheel 21 side, a pair of rear suspensions 24 (only a right-hand one is shown) which suspend the power unit 19 at a rear upper portion of the body frame 11, a seat 25 mounted on the body frame 11, and a body cover 26 which covers the body frame 11.

The body cover 26 is made up of a front cover 31 which covers a front portion of the head pipe 12, flat step floors 32 for accommodating a rider's feet thereon, under-covers 33 disposed below the step floors 32 to cover a lower portion of the body frame 11, and a rear cover 34 which covers the half of the rear side of the body frame 11. A rear side 36 of the front cover 31 is formed upward from the step floors 32 at a side opposed to the vehicle rider.

The rear brake unit 23 is made up of a disc brake 41 and a parking device 42. In the disc brake 41, a brake lever 43 (see FIG. 4) and a master cylinder 44 are attached to the left-hand side of the handle 16. A one end of a brake hose 45 is connected to the master cylinder 44 while an opposite end of the brake hose 45 is connected to a rear disc brake 46. In the rear disc brake 46, a brake disc 47 is integrally attached to the rear wheel 21 and a brake caliper 48 is secured to the swing arm 22 through a bracket (not shown).

In the parking brake 42, which is used for keeping the vehicle 10 in a stopped state, a parking caliper 51 is attached to the swing arm 22. One end of a cable 53 is connected to an arm 52 of the parking caliper 51 and an opposite end of the cable 53 is connected to a parking lever mechanism 54 disposed within the front cover 31.

When the arm 52 is turned in the direction of "arrow 1" (shown in FIG. 2) with the cable 53, the parking caliper 51 pinches the brake disc 47.

FIG. 3 is an enlarged view of the portion indicated by the numeral 3 in FIG. 2 showing a section of the article container box 1 and a side face of the parking lever mechanism 54.

The parking lever mechanism 54 is made up of a support plate 61 attached through a bracket 58 to a down-pipe 57 which extends downward from the head pipe 12 of the body frame 11. The parking lever mechanism 54 also includes a side plate 64 secured to the support plate 61 with bolts 62 and 63, a parking lever 65 mounted between the support plate 61 and the side plate 64 pivotably with a bolt 62, a grip 66 attached to the parking lever 65, and a cable retaining portion 67. A toothed portion 68 and a return spring portion 69 are formed in the parking lever 65, and a ratchet 71 is pivotably mounted with a bolt 63 and engaged with the toothed portion 68 to stop the turning motion of the parking lever 65 at a predetermined position and cancel the stopped condition. The grip 66 is provided with a portion for canceling/disengaging the stopped state of the ratchet 71. A pair of bracket mounting bolts 72 is provided to secure the parking lever mechanism 54 to the down pipe 57. The parking lever 65 and the grip 66 are received within a recess 73 formed in the front cover 31 so that the grip 66 does not project from a surface 74 of the front cover 31.

Next, the operation of the parking lever 54 will be briefly described hereinafter.

If the grip 66 is pulled up in the direction of "arrow 2" by hand, the grip moves within the recess 73 up to its position shown by phantom lines in FIG. 3. At the same time, the cable retaining portion 67, toothed portion 68 and return spring retaining portion 69 turn by a predetermined angle with bolts 62 serving as pivot shafts. At this time, the ratchet 71 comes into engagement with the toothed portion 68 with bolt 63 as a pivot shaft. Accordingly, the grip 66 stops and the cable retaining portion 67 pulls the cable 53 (in the direction of "arrow 2").

That is, if the grip 66 is held by hand and the parking lever 65 is pulled up in the direction of arrow 2, the parking caliper 51 shown in FIG. 2 pinches the brake disc 47 to stop the rotation of the rear wheel 21.

As shown in FIG. 3, a lower portion 75 of the front cover 31 with the parking lever 65 disposed therein has the surface 74 which is inclined forwardly and downward at an angle of θ1 relative to a horizontal line HL. Consequently, the feet and leg portions below the knees of a rider M (FIG. 2) are less likely to strike against the parking lever 65 and the grip 66.

The article container boxes 17 are made up of a box body 77 and a lid 79 disposed on an opening 78 of the box body and inclined toward the rider. A hinge 81 is provided to permit the lid 79 to be opened and closed in the direction of arrow 4.

An upper portion 82 (in the direction of arrow 5) of the front cover 31 with the article container boxes 17 disposed therein has a surface 83 which is inclined forwardly and upward at an angle of θ2 relative to the horizontal line HL. Consequently, articles can be taken into and out of the container boxes 17 easily.

FIG. 4 is a frontal view as seen in the direction of arrow 4 in FIG. 2. As shown in FIG. 4, flat step floors 32 for putting feet thereon are provided between the handle 16 and the seat 25. The head pipe 12 which supports the handle 16 is covered with the front cover 31, and the brake lever 43 and the master cylinder 44 are attached to the left-hand side of the handle 16. One end of the brake hose 45 is connected to the master cylinder 44, and the article container boxes 17 are disposed on right and left sides. A plurality of meters 85 and a throttle grip 86 are disposed on the right-hand side of the handle 16.

FIG. 5 is an enlarged view of the portion indicated by numeral 5 in FIG. 4. As shown in FIG. 5, the parking lever 65 and the grip 66 are disposed below the right-hand article container box 17. The parking lever 65 and grip 66 are received within the recess 73 formed in the front cover 31 so that the parking lever 65 and the grip 66 are set so as not to project from the surface 74 of the front cover 31.

As shown in the same figure, the parking lever 65 and the grip 66 are also disposed on the right-hand side like the throttle grip 86. Consequently, the rider can stretch his or her right hand without any forced motion and operate the parking lever 65. Thus, there is no risk of the operability of the vehicle being impaired.

FIG. 6 is a sectional view taken along line 6—6 in FIG. 5. As shown in FIG. 6, the parking lever 65 and the grip 66 are disposed below the right-hand article container box 17. The support plate 61 is attached to the down-pipe 57 through the bracket 58, the parking lever 65 and the side plate 64 are secured to the support plate 61 with bolt 62, and the grip 66 is received within the recess 73.

Further, the article container boxes 17 are disposed in an upper portion 82 of the rear side 36 of the front cover 31 in order to accommodate the large opening 78 of each article container box 17.

The following description of the operation of the vehicular parking device layout structure described above is provided hereinafter.

As shown in FIG. 1, since the article container boxes 17 are disposed in the upper portion 82 of the rear side 36 of the front cover 31, the surface area of the opening 78 of each container box 17 can be increased and it is possible to enlarge the capacity of each container box.

Since the article container boxes 17 are disposed in the upper portion 82 of the rear side 36 of the front cover 31, the article container boxes 17 of a large capacity can be provided around the vicinity of the handle 16 of the front cover 31.

Moreover, since the article container boxes 17 are disposed in the upper portion 82 of the rear side 36 of the front cover 31, the opening 78 of each container box 17 can be positioned within the reach of the rider M and the rider can easily access articles while sitting on the seat 25.

Since the parking lever 65 is disposed below the article container boxes 17, the rider can reach his or her hand to grasp the grip 66 and operate the parking lever 65 without taking any forced posture. Thus, it is possible to ensure improved operability of the parking lever 65.

Further, since the parking lever 65 is disposed below the article container boxes 17, the parking lever 65 and the grip 66 can be hidden by the container boxes and can be made inconspicuous.

A description will be given below of a parking device layout structure according to another embodiment of the present invention.

FIG. 7 is an enlarged view of the portion indicated by the numeral 3 in FIG. 2 according to another embodiment of the present invention. The parking lever mechanism 54B is characterized in that a boot or cover 90 is attached to a parking lever 65. More specifically, the parking lever mechanism 54B includes a support plate 61 attached through a bracket 58 to a down-pipe 57 which extends downward from a head pipe 12 of a body frame 11, a side plate 64 secured to the support plate 61 with bolts 62 and 63, a parking lever 65 pivotably mounted between the support plate 61 and the side plate 64 with a bolt 62, and a grip 66 attached to the parking lever 65. A cable retaining portion 67, a toothed portion 68 and a return spring retaining portion 69 are formed in the parking lever 65.

The parking lever mechanism 54B also includes a ratchet 71 pivotably mounted with a bolt 63 and engaged with the toothed portion 68 to stop the turning motion of the parking lever 65 at a predetermined position and for cancelling the stopped condition. The boot 90 surrounds the parking lever 65. The grip 66 is provided with a device for cancelling the stopped state of the ratchet 71. A pair of bracket mounting bolts 72 are also provided.

The parking lever 65 and the grip 66 are received within a recess 73 formed in a front cover 31 and the boot 90 is mounted to the recess 73. The grip 66 is designed so as not to project from a surface 74 of the front cover 31.

Next, the operation of the parking lever mechanism 54B will be briefly described hereinafter. When the grip 66 is pulled up in the direction of arrow 2 by hand, the grip moves within the recess 73 up to its position shown in phantom. At the same time, the cable retaining portion 67, toothed portion 68 and return spring retaining portion 69 turn at a predetermined angle with bolt 62 serving as a pivot shaft. At this time, the ratchet 71 comes into engagement with the toothed portion 68 with bolt 63 as a pivot shaft, the grip 66 stops, and the cable retaining portion 67 pulls the cable 53 (in the direction of arrow 2).

That is, if the driver grasps the grip 66 by hand and pulls up on the parking lever 65 in the direction of arrow 2, a parking caliper 51 shown in FIG. 2 pinches a brake disc 47 to stop the rotation of a rear wheel 21.

As shown in FIG. 7, a lower portion 75 of the front cover 31 with the parking lever 65 disposed therein has a surface 74 which is inclined forwardly and downward (in the direction of arrow 3) at an angle of θ1 relative to a horizontal line HL. Consequently, the feet and leg portions below the knees of a rider M (FIG. 2) are less likely to strike against the parking lever 65 and the grip 66.

FIG. 8 is a sectional view taken along line 8—8 in FIG. 7. As shown in FIG. 8, the parking lever 65 and the grip 66 are disposed below a right-hand article container box 17, the support plate 61 is attached to the down-pipe 57 through the bracket 58, and the parking lever 65 and the side plate 64 are secured to the support plate 61 with bolt 62. The grip 66 is received within the recess 73, the parking lever 65 is surrounded with the boot 90, and the boot 90 is mounted to the recess 73.

FIGS. 9(a) through 9(b) are side views of a boot according to an embodiment of the present invention. FIGS. 9(a) and 9(b) are explanatory diagrams of the boot related to the present invention, of which FIG. 9(a) is a perspective view and FIG. 9(b) is a sectional view taken along line b—b in FIG. 9(a).

In FIG. 9(a), the boot 90 is a cover in which a lever mounting portion 91 is centrally formed. The boot 90 also includes a fitting hole 92 formed in the lever mounting portion 91, a bellows portion 94 formed for expansion and contraction from the lever mounting portion 91 toward an outer peripheral portion 93, and a sealing face 95 formed on the outer peripheral portion 93. Mounting pins 96 (two first pins 96a and a second pin 96b) are formed on the back of the outer peripheral portion 93, the second pin 96b being formed with a reinforcing portion 93a.

For mounting the boot 90, first the parking lever 65 is passed through the fitting hole 92 formed in the lever mounting portion 91 and an edge 66a of the grip 66 is brought into abutment against the lever mounting portion 91 as indicated by a double-dashed dotted line. The mounting pins are fitted in holes (not shown) formed in the front cover 31 (see FIG. 7) and the sealing face 95 is brought into close contact with the surface of the recess 73.

In FIG. 9(b), the fitting hole 92 includes a body portion 92a extending contiguously from the lever mounting portion 91 and a sealing portion 92b formed on a front end side of the body portion 92a.

The sealing portion 92b has an interference fit smaller than the size of the parking lever 65. With this interference, the sealing portion 92 comes into close contact with the parking lever 65 to prevent water from reaching the grip 66 through the outer periphery of the parking lever 65.

Since the mounting pins 96 (two first pins 96a (see FIG. 9(a)), a second pin 96b) and the sealing face 95 are provided for the boot 90, the sealing face 95 is held in close contact with the surface of the recess 73 in the front cover 31. This prevents water from flowing between the front cover 31 and the parking lever 65 and reaching the grip 66.

Next, the operation of this embodiment will be described hereinafter with reference to FIG. 7. Water W may enter from the front side of the parking lever mechanism 54B, for example during travel in the rain or muddy environments. In the parking lever mechanism 54B, as shown in FIG. 7, in the event of entry of water W, since the boot 90 is attached to the parking lever 65, the sealing portion 92a prevents water W from flowing along the parking lever 65, where it is possible to prevent stain of the grip 66 and hence the grip can be operated comfortably.

Moreover, since the sealing face 95 is put in close contact with the surface of the recess 73, it is possible to prevent water W from flowing between the front cover 31 and the parking lever 65 and reaching the grip 66. Therefore, the grip 66 can be operated comfortably.

Further, since the bellows portion 94 is formed for expansion and contraction, even if the parking lever 65 is operated like arrow 2, it is possible to retain the sealability of the sealing portion 92a and the sealing face 95. Therefore, water W does not reach the grip 66, whereby it is possible to prevent staining and water damage of the grip 66.

The shapes of the article container boxes 17, parking lever 65 and grip 66 shown in the above embodiments are not particularly limited. As to the configuration of the parking lever mechanism 54B, it is not limited to the configuration illustrated in FIG. 7. For example, although the parking lever 65 and the grip 66 are disposed on the right-hand side in the above embodiments, both may be disposed on the left-hand side.

The shape of the boot 90 shown in FIG. 9 is an example of a possible boot 90 configuration. However, the boot shape may be changed as desired, and/or depending on the size of the parking lever 65 and the shape of the front cover 31.

With the above construction, the present invention exhibits the following effects. Since each article container box is disposed in an upper portion of the rear side of the front cover in a scooter type vehicle, an opening of the container box can be made relatively larger. Accordingly, it is possible to enlarge the overall capacity of the container box.

Since an article container box is disposed in an upper portion of the rear side of the front cover in a scooter type vehicle, a container box of a large capacity can be provided in the front cover and in the vicinity of a handle. Further, the container box can be brought near a position at which the rider sitting on the seat can reach the container box easily without requiring any forced motion and hence articles can be taken in and out of the article container boxes more easily.

Further, since a parking lever is disposed below the article container boxes, the parking lever can be installed in the front cover at a position close to the handle at which the driver sitting on the seat can reach the container box easily without requiring any forced motion and hence can operate the parking lever easily. The container boxes also hide the parking lever, and thus the parking lever can be disposed inconspicuously in the front cover and in the vicinity of the handle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scooter vehicle comprising:
   a handle for operatively controlling a front wheel of a pair of wheels;
   a rider's seat;
   a head pipe supporting the handle and covered by a front cover;
   flat step floors for putting feet thereon are provided between the handle and the seat;
   an article container box disposed at an upper position of a rear side of said front cover; and
   a vehicular parking device having a parking lever, said parking lever disposed in a position below said article container box; wherein said parking lever is disposed within a recess formed in the front cover.

2. A scooter vehicle according to claim 1, said article container box includes a box body and a lid disposed on an opening of the box body, said opening inclined in a position toward the rider's seat.

3. A scooter vehicle according to claim 1, said vehicular parking device further including a grip disposed on said parking lever, wherein said grip and said parking lever are disposed within the recess formed in the front cover.

4. A scooter vehicle according to claim 1, said vehicular parking device further including a pivot center, a cable retaining portion, a ratchet and a grip, wherein said vehicular parking device pivots around said pivot center and said cable retaining portion, said ratchet and said grip are positioned extending away from said pivot center in order, respectively.

5. A scooter vehicle comprising:
   a handle for operatively controlling a front wheel of a pair of wheels;
   a rider's seat;
   a head pipe supporting the handle and covered by a front cover;
   flat step floors for putting feet thereon are provided between the handle and the seat;
   an article container box disposed at an upper position of a rear side of said front cover; and
   a vehicular parking device having a parking lever, said parking lever disposed in a position article container box; wherein said vehicular below said parking device further includes
   a support plate attached through a bracket to a down pipe which extends in downward direction from the head pipe;
   a side plate secured to the support plate;
   a grip attached to the parking lever, said parking lever pivotably mounted between the support plate and the side plate.

6. A scooter vehicle according to claim 5, wherein said parking lever mechanism further includes
   a toothed portion;

a cable retaining portion;

a return spring portion; and a ratchet pivotably mounted in engagement with the toothed portion to limit a turning motion of the parking lever at a predetermined position.

7. A scooter vehicle according to claim 5, wherein said grip and said parking lever are disposed within a recess formed in the front cover.

8. A scooter vehicle according to claim 6, wherein said grip and said parking lever are disposed within a recess formed in the front cover.

9. A scooter vehicle comprising:

a handle for operatively controlling a front wheel of a pair of wheels;

a rider's seat;

a head pipe supporting the handle and covered by a front cover;

flat step floors for putting feet thereon are provided between the handle and the seat;

an article container box disposed at an upper position of a rear side of said front cover;

a vehicular parking device having a parking lever, said parking lever disposed in a position below said article container box, wherein the parking lever is received within a recess formed in the front cover; and a boot in a position surrounding said parking lever.

10. A scooter vehicle according to claim 9, wherein the boot is mounted to the recess.

11. A scooter vehicle according to claim 9, said article container box includes a box body and a lid disposed on an opening of the box body, said opening inclined in a position toward the rider's seat.

12. A scooter vehicle according to claim 9, said vehicular parking device further including a grip disposed on said parking lever, wherein said grip and said parking lever are disposed within the recess formed in the front cover.

13. A scooter vehicle according to claim 9, said vehicular parking device further including a pivot center, cable retaining portion, a ratchet and a grip, wherein said vehicular parking device pivots around said pivot center and said cable retaining portion, said ratchet and said grip are positioned extending away from said pivot center in order, respectively.

14. A scooter vehicle comprising:

a handle for operatively controlling a front wheel of a pair of wheels;

a rider's seat;

a head pipe supporting the handle and covered by a front cover;

flat step floors for putting feet thereon are provided between the handle and the seat;

an article container box disposed at an upper position of a rear side of said front cover;

a vehicular parking device having a parking lever, said parking lever disposed in a position below laid article container box;

a boot in a position surrounding said parking lever, wherein said vehicular parking device further includes a support plate attached through a bracket to a down pipe which extends in downward direction from the head pipe;

a side plate secured to the support plate;

a grip attached to the parking lever, said parking lever pivotably mounted between the support plate and the side plate.

15. A scooter vehicle according to claim 14, wherein said parking lever mechanism further includes a toothed portion;

a cable retaining portion;

a return spring portion; and a ratchet pivotably mounted in engagement with the toothed portion to limit a turning motion of the parking lever at a predetermined position.

16. A scooter vehicle comprising:

a handle for operatively controlling a front wheel of a pair of wheels;

a rider's seat;

a head pipe supporting the handle and covered by a front cover;

flat step floors for putting feet thereon are provided between the handle and the seat;

an article container box disposed at an upper position of a rear side of said front cover;

a vehicular parking device having a parking lever, said parking lever disposed in a position below paid article container box;

a boot in a position surrounding said parking lever;

a lever mounting portion;

a fitting hole formed in the lever mounting portion;

a bellows portion permitting expansion and contraction of the lever mounting portion toward an outer peripheral portion; and a sealing face formed of the outer peripheral portion.

17. A scooter vehicle according to claim 16, wherein said parking lever engaged with said boot in a position where said parking lever passes through said fitting hole.

18. A scooter vehicle according to claim 16, wherein said fitting hole includes a body portion extending from the lever mounting portion and a sealing mounting portion formed on a front end side of the body portion.

* * * * *